(12) United States Patent
Ishikawa

(10) Patent No.: US 7,603,383 B2
(45) Date of Patent: Oct. 13, 2009

(54) IMAGE COMMUNICATION SYSTEM, SERVER APPARATUS, AND IMAGE COMMUNICATION METHOD

(75) Inventor: Tomoe Ishikawa, Sumida-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 11/218,520

(22) Filed: Sep. 6, 2005

(65) Prior Publication Data

US 2006/0050973 A1 Mar. 9, 2006

(30) Foreign Application Priority Data

Sep. 3, 2004 (JP) ............................. 2004-257420
Jul. 22, 2005 (JP) ............................. 2005-213373

(51) Int. Cl.
*G06F 7/00* (2006.01)
(52) U.S. Cl. ..................... 707/104.1; 382/232; 382/305
(58) Field of Classification Search .............. 707/104.1; 382/232, 305
See application file for complete search history.

(56) References Cited

U.S. PATENT DOCUMENTS

| | | | |
|---|---|---|---|
| 6,449,639 B1 * | 9/2002 | Blumberg | 709/217 |
| 6,970,508 B1 * | 11/2005 | Kondo | 375/240.14 |
| 2003/0018818 A1 | 1/2003 | Boliek et al. | 709/247 |
| 2003/0067627 A1 * | 4/2003 | Ishikawa et al. | 358/1.15 |
| 2004/0078491 A1 * | 4/2004 | Gormish et al. | 709/247 |
| 2004/0126029 A1 * | 7/2004 | Sakuyama et al. | 382/240 |
| 2004/0205199 A1 * | 10/2004 | Gormish | 709/229 |
| 2005/0063599 A1 * | 3/2005 | Sato | 382/232 |

FOREIGN PATENT DOCUMENTS

| JP | 2003-23630 | 1/2003 |
|---|---|---|
| JP | 2004-40674 | 2/2004 |

\* cited by examiner

*Primary Examiner*—Khanh B Pham
*Assistant Examiner*—Jieying Tang
(74) *Attorney, Agent, or Firm*—Fitzpatrick, Cella, Harper & Scinto

(57) ABSTRACT

In an image communication system including a server which stores image data encoded in accordance with a hierarchy coding, and a client configured to download the image data from the server and display the image data, the server determines on the basis of a request received from the client whether a specific command is requested, when the specific command is requested, generates return data by adding additional data representing the encoding condition of the image data encoded in accordance with the hierarchy coding to image data which has undergone processing designated by the specific command, and transmits the return data to the client. With this arrangement, the client can receive desired image data by one communication between the server and the client.

17 Claims, 14 Drawing Sheets

SEGMENTED INTO THREE TILE-PARTS

FOR ONE TILE-PART

IMAGE COMMUNICATION SYSTEM, SERVER APPARATUS, AND IMAGE COMMUNICATION METHOD

FIELD OF THE INVENTION

The present invention relates to an image communication system, a server apparatus, and an image communication method and, more particularly, to an image communication system which causes a client side to display a thumbnail of an image held in a server, a server apparatus, and an image communication method.

BACKGROUND OF THE INVENTION

Digital cameras are becoming increasingly common in recent years. The number of pixels is also increasing enormously, and typical devices have about 2,000,000 to 5,000,000 pixels. Advanced models with pixels on the order of 10,000,000 are also becoming popular. It can readily be imagined that the resolution should further increase in the future.

The number of users who upload an image sensed by a digital camera to a server which provides an online album service is also rising. In such a system, various kinds of image browsing software are used. Generally, an overview of thumbnail images is displayed first on the client side. The user selects an image to be magnified (enlarged) from the list, and the image is displayed in a size larger than the thumbnail image.

However, if the whole data of a digital camera image containing a large number of pixels is downloaded from the server every time its magnified image is displayed, a long waiting time is necessary until the image is displayed on the client terminal.

Techniques to solve this problem have been developed. In these techniques, image data having a plurality of resolutions and image data obtained by segmenting image data of each resolution into a plurality of tiles and encoding them are saved in a server, and only partial data necessary for display is downloaded and displayed. Since multiple resolutions are prepared, the system can cope with display size change by the client. Since an image is segmented into tiles, the client user can access a partial region of the image at random.

In typical techniques, JPEG 2000 and JPIP are used (Japanese Patent Laid-Open Nos. 2003-23630, which corresponds to US 2003-018818-A1 and 2004-40674). JPEG 2000 is standardized in 2001 as an image encoding method for multiple resolutions and tile segmentation. JPIP indicates JPEG 2000 image coding system—Part 9: interactivity tools, APIs and Protocols (to be referred to as JPIP hereinafter), which has been standardized on November 2004, as a protocol to fragmentarily access and display a file encoded in accordance with JPEG 2000.

Japanese Patent Laid-Open No. 2003-23630 discloses a technique of a server/client system which transmits/receives partial data of JPEG 2000 image data stored in a server. More specifically, a client requests a compressed data portion, which is not stored yet in the buffer, of a server on the basis of information representing which parts of a code stream stored in the server are already stored in the client's buffer. The server extracts the requested partial data of the compressed data and returns the data to the client. Finally, the received data and already stored data are integrated on the client side, thereby obtaining an image.

Japanese Patent Laid-Open No. 2004-40674 discloses a technique to cause the client side to execute quick progressive display of JPEG 2000 encoded data stored on the server side. More specifically, the server extracts, from a file, sub-band encoded data of resolution level designated by the client and transmits the data to the client. The client issues, to the server, a request to designate a desired resolution level and reconstructs image data by combining the decoded sub-band coefficients of the resolution level of the currently displayed image and sub-band coefficients obtained by decoding the encoded data received from the server, thereby implementing progressive display.

To efficiently transmit/receive JPEG 2000 image data between the server and the client by using such a technique, data received by the client must be cached (saved), as in the above-described techniques of Japanese Patent Laid-Open Nos. 2003-23630 and 2004-40674. This is because JPEG 2000 image data of each resolution level is difference data with respect to image data of resolution level lower by one step. When already received fragmented data is cached on the client side, only difference data with respect to the received data needs to be transmitted/received in magnifying the image or increasing the image quality. With this arrangement, the communication data amount can be reduced, and an efficient image communication system can be implemented.

As described above, to obtain a thumbnail image by receiving part of JPEG 2000 image data, the client must designate a resolution level necessary for thumbnail display and request it of the server.

For example, to use the technique described in Japanese Patent Laid-Open No. 2003-23630, the client must know the structure of a code stream stored in the server. First, the client terminal apparatus requests the main header of image data of the server. The client receives the main header and analyzes it. On the basis of the analysis result, the client specifies the JPEG 2000 resolution level necessary for display of a thumbnail image. A request to acquire data of the specified resolution level is issued to the server to acquire the thumbnail image. This sequence is necessary because the number of resolution levels of original image data encoded in accordance with JPEG 2000 or the image size of each resolution level is unknown.

To display a thumbnail image on the client terminal apparatus, at least two communications occur between the server and the client. Since the line speed of a network is high today, in a stateless system, the time required to begin a session between the server and the client makes up a relatively large proportion of data transmission/reception. If two communications are necessary for acquiring a thumbnail image, the thumbnail image is displayed late.

To use the technique described in Japanese Patent Laid-Open No. 2004-40674, request/response must be repeated until the resolution level desired by the client for thumbnail display is obtained. Even in this case, communication must be performed a plurality of number of times.

The same problem also occurs in acquiring a ROI (Region Of Interest). To display a ROI portion on the full screen of a terminal, the header of JPEG 2000 image data is analyzed to specify the size of the ROI. Then, the image size for ROI display is designated. To do this, at least two communications occur between the server and the client.

SUMMARY OF THE INVENTION

It is an object of the present invention to provide an image communication system which allows a client to receive desired image data by one communication between the server and the client.

It is another object of the present invention to provide an image communication system which enables an interactive operation between a server and a client for image data by, e.g., JPIP communication by causing the client side to know the encoding condition of the original image data of received image data at the time of data reception.

In order to achieve the above objects, according to one aspect of the present invention, there is provided an image communication system including a server which stores JPEG 2000 image data encoded with a hierarchy coding, and a client configured to download image data from the server and display and image based on the download image data, wherein the server receives a request from the client, determines on the basis of the received request whether a specific command is requested, and, when the specific command is requested, generates new image data in accordance with the specific command from JPEG2000 image data stored in the stored unit, extracts additional data representing an encoding condition of the JPEG2000 image data, generates return data comprising the new image data and the additional data, and transmits the return data to the client.

For example, communication between the server and the client is in conformity to a JPIP.

With the above arrangement, the client can receive desired image data by one communication between the server and the client.

In addition, when the client side acquires the additional data representing the encoding condition of the image data, which is added to the received image data, at the time of receiving the data, an interactive operation for the image data between the server and the client can efficiently be executed by, e.g., JPIP communication.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

In this embodiment, a method will be described, in which a server which holds a plurality of already generated JPEG 2000 files receives a request from a client, analyzes the request, generates a thumbnail image from a designated JPEG 2000 image, and transmits the thumbnail image to the client. The client user opens a homepage to provide an album service by using a personal computer that operates with Windows® serving as an OS, transmits a thumbnail acquisition request to the server in accordance with link information to acquire a thumbnail image of a JPEG 2000 image on that homepage, and acquires and displays the thumbnail image by using the mechanism of JPIP.

Figure 1:
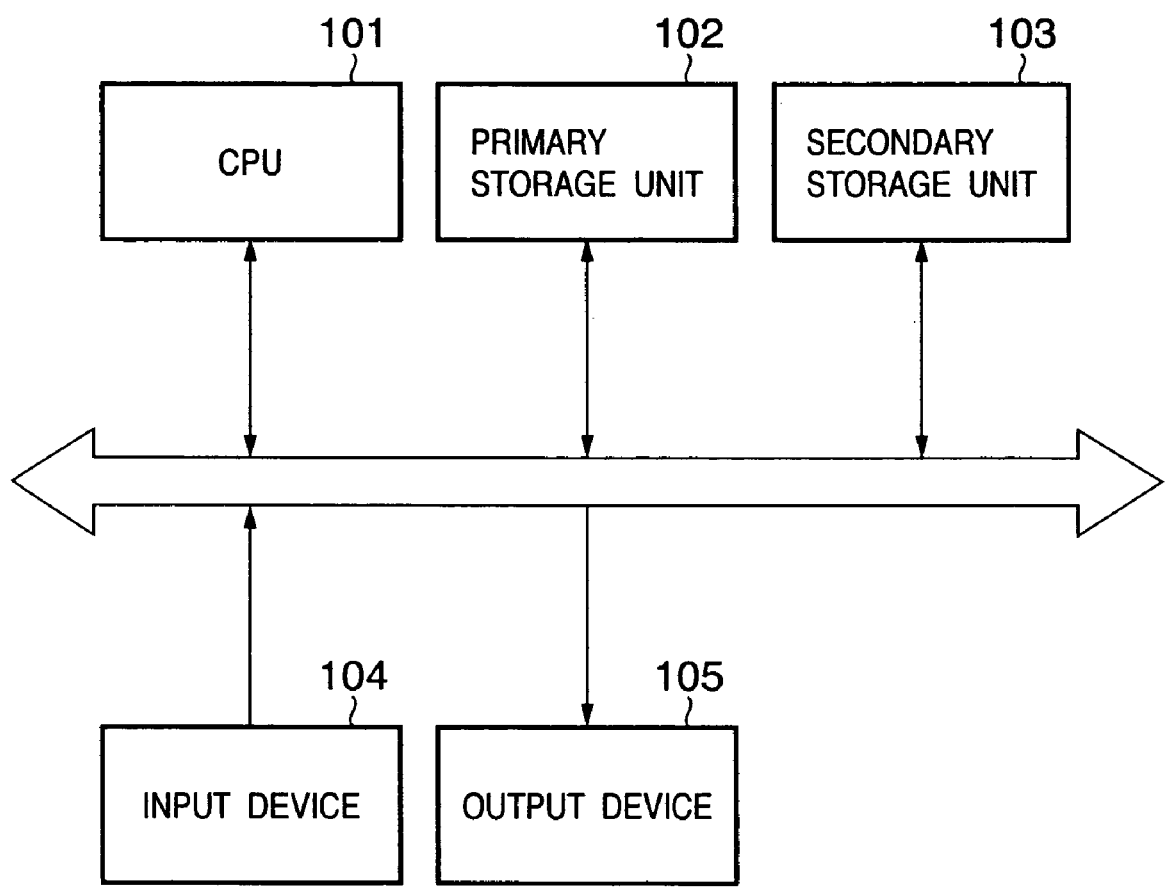
FIG. 1 is a block diagram showing the system configuration of a computer according to an embodiment of the present invention.

FIG. 1 is a block diagram showing the schematic arrangement of a client terminal apparatus according to this embodiment. A CPU 101 controls the operation of the whole terminal apparatus and executes a program stored in a primary storage unit 102. The primary storage unit 102 is a main memory which reads out a program stored in a secondary storage unit 103 and stores it. The secondary storage unit 103 corresponds to, e.g., a hard disk. Generally, the capacity of the primary storage unit 102 is smaller than that of the secondary storage unit 103. Programs and data which cannot be stored in the primary storage unit 102 are stored in the secondary storage unit 103. Data which must be stored for a long time are also stored in the secondary storage unit 103. In this embodiment, a program is stored in the secondary storage unit 103. In executing the program, it is loaded in the primary storage unit 102 and executed by the CPU 101.

An input device 104 corresponds to, e.g., a mouse or keyboard, which is used to, e.g., send an interrupt signal to a program. As an output device 105, for example, a monitor or printer can be used.

The client apparatus can have various forms in addition to the above-described form, though it is not the gist of the present invention, and a description thereof will be omitted.

Figure 2:
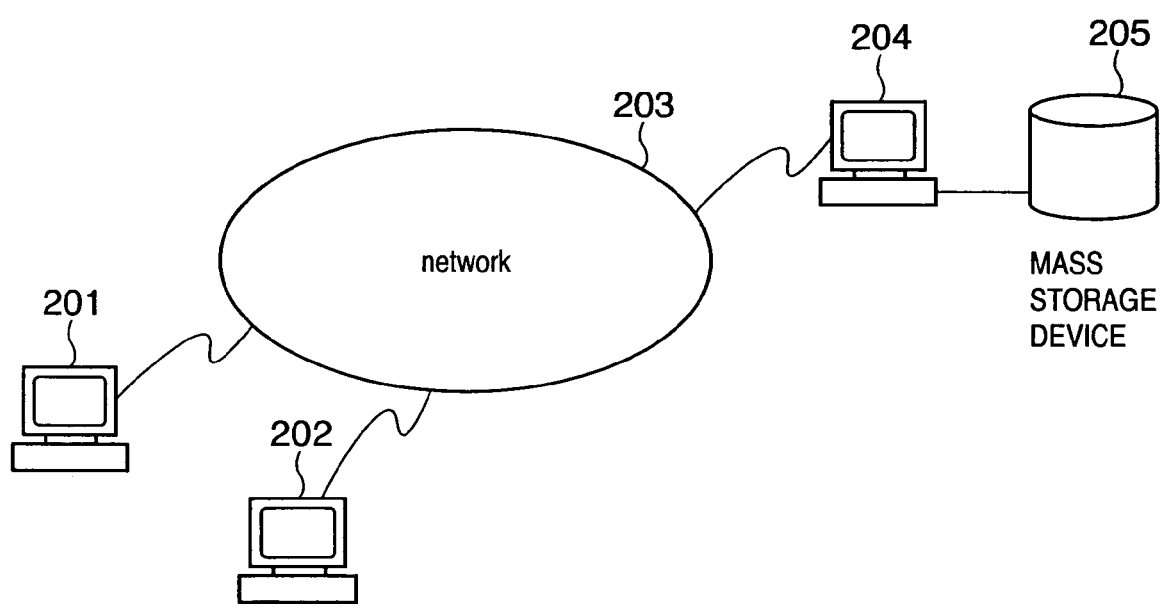
FIG. 2 is a view showing the arrangement of a server/client system according to the embodiment.

FIG. 2 is a view showing the outline of a server/client system to implement this embodiment. Reference numeral 201 denotes a client 1; and 202, a client 2. Each client has the arrangement described with reference to FIG. 1. A plurality of clients such as the clients 1 and 2 can communicate with a server 204 through a wireless or wired network 203.

The server 204 has a mass storage device (hard disc drive) 205 to store image files. The storage device 205 corresponds to, e.g., a hard disk. The storage device 205 stores a number of image data encoded in accordance with the JPEG 2000 encoding method. The client 201 or 202 receives fragmented data from JPEG 2000 image data stored in the server 204 and saves the data.

Typical JPEG 2000 encoded data will be described next with reference to FIG. 3. JPEG 2000 encoded data has, in its head field, data called a Main Header 301 in which the encoding condition of the entire image is described. Tile data follow the Main Header. Each tile data has header data called a Tile Header 302 which describes the encoding condition of the tile, and encoded unit data called a packet 303 which forms the encoded data of the tile.

Figure 3:
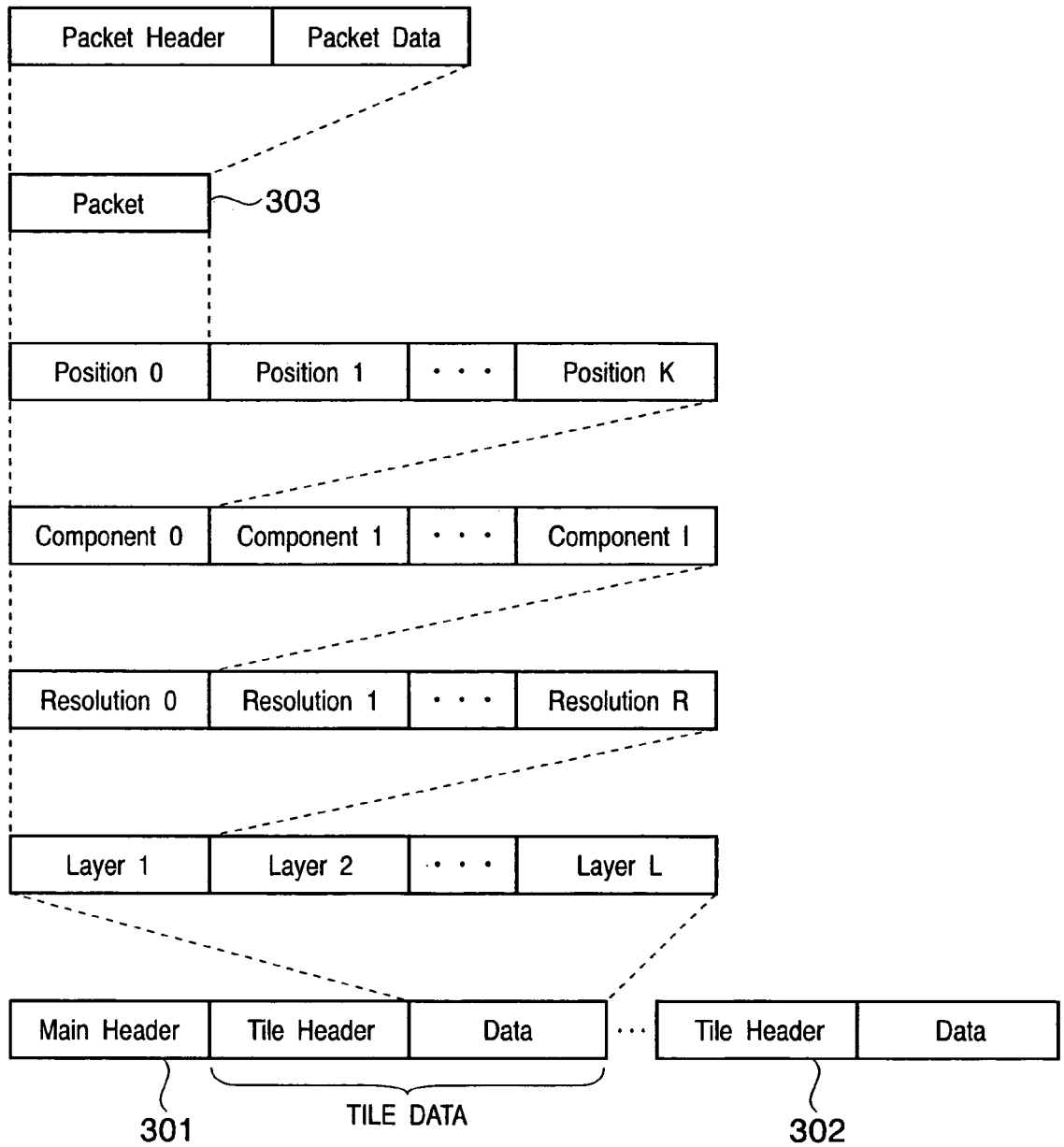
FIG. 3 is a view showing the structure of general JPEG 2000 encoded data.

FIG. 3 shows the structure of a JPEG 2000 file in which packet data are recorded along Layer-Resolution level-Component-Position progression (LRCP). According to LRCP, layer, resolution, component, and position data are recorded in this order. This order of data is called a progression order. Position here corresponds to precinct in JPEG 2000 encoded data.

The following five types are defined as the progression order. The progression order can easily be changed by changing the order of packet data.

Layer-Resolution level-Component-Position (LRCP)
Resolution level-Layer-Component-Position (RLCP)
Resolution level-Position-Component-Layer (RPCL)
Position-Component-Resolution level-Layer (PCRL)
Component-Position-Resolution level-Layer (CPRL)

The tile data shown in FIG. 3 are arranged in the JPEG 2000 encoded data in the ascending order of tile numbers. However, the tile data need not always be arranged in the order of tile numbers.

Figure 11A:
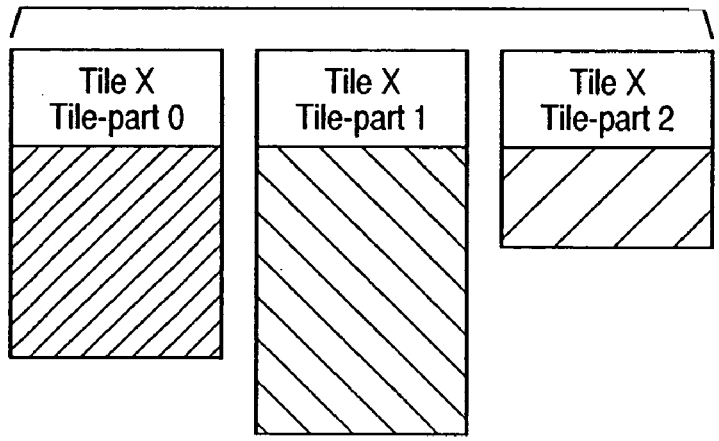
FIGS. 11A and 11B are views showing the relationship between a tile and tile-parts in JPEG 2000 encoded data.
Figure 11B:
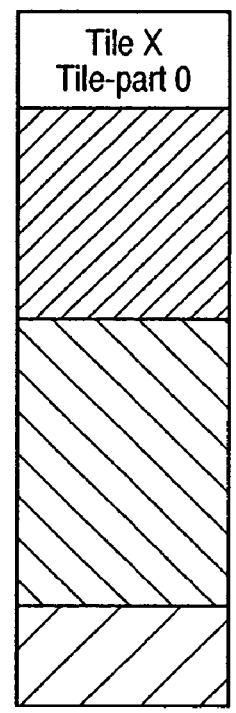

In FIG. 3, tile data has been described as one data. Actually, each tile can be segmented into a plurality of tile-parts. Hence, two numbers, i.e., a tile number and a tile-part number are described in the tile header. FIGS. 11A and 11B show the relationship between a tile and tile-parts.

Figure 4:
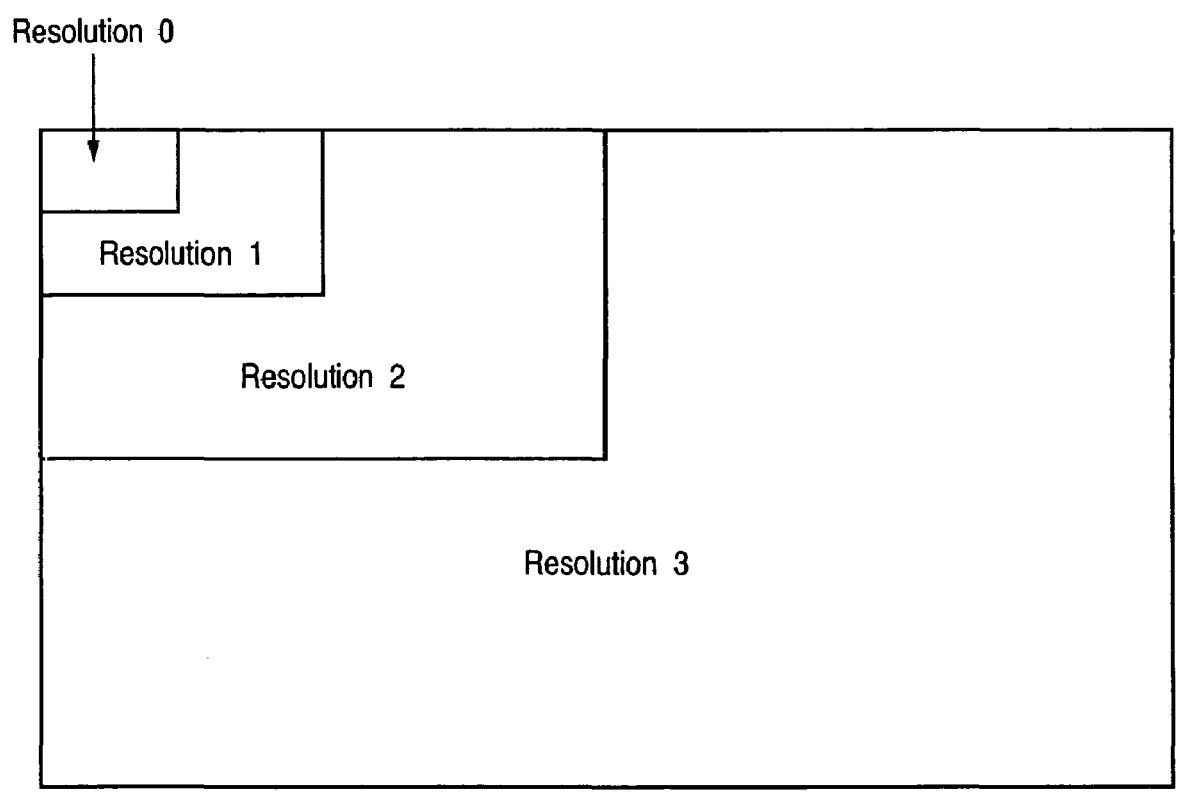
FIG. 4 is a view for explaining the resolution scalability of JPEG 2000.

FIG. 4 shows the resolution scalability, i.e., the relationship between resolutions (image sizes) and resolution numbers in JPEG 2000 encoded data. The resolution number of an image with the lowest resolution is set to 0. The width and height of the image double every time the resolution number is incremented by one.

In each layer, data are stored in the ascending order of resolution numbers. A layer number corresponds to the S/N ratio to the original image of an image to be reconstructed. The smaller the layer number becomes, the poorer the S/N ratio becomes. The maximum values of the resolution number, layer number, and component number in one JPEG 2000 file are preset by an encoder and encoded in accordance with the parameters. This information is stored in encoded data.

In this embodiment, JPEG 2000 image data held in the server has three resolutions corresponding to the following sizes.

Resolution level 0 . . . 400×300 [pixel]
Resolution level 1 . . . 800×600 [pixel]
Resolution level 2 . . . 1600×1200 [pixel]

A case will be considered, in which the client transmits the following command to the server having such data in accordance with the definition of JPIP to acquire a thumbnail image of about 320×240 [pixel]. http://www.image.com/JPIP.cgi?target=sample.jp2&roi=ganon-thumbnail&fsiz=320,240&type=image/jpeg In this case, "target" in the transmission character string is a field to designate the resource name, "roi" is a field to designate the name of a ROI region, "fsiz" is a field to designate the size of the entire image, and "type" is a field to designate the return data format. That is, the client requests image data in a ROI region named "ganon-thumbnail" of a sample.jp2 image. It is instructed that the entire image to be returned should have a size of 320×240 [pixel], and the return data format should be JPEG. The ROI "ganon-thumbnail" is a special command to request special data and is defined between the server and the client of this embodiment to indicate encoded thumbnail image data representing a thumbnail image and main header data of JPEG 2000 encoded data, which is appended next to the encoded thumbnail image data.

Figure 5:
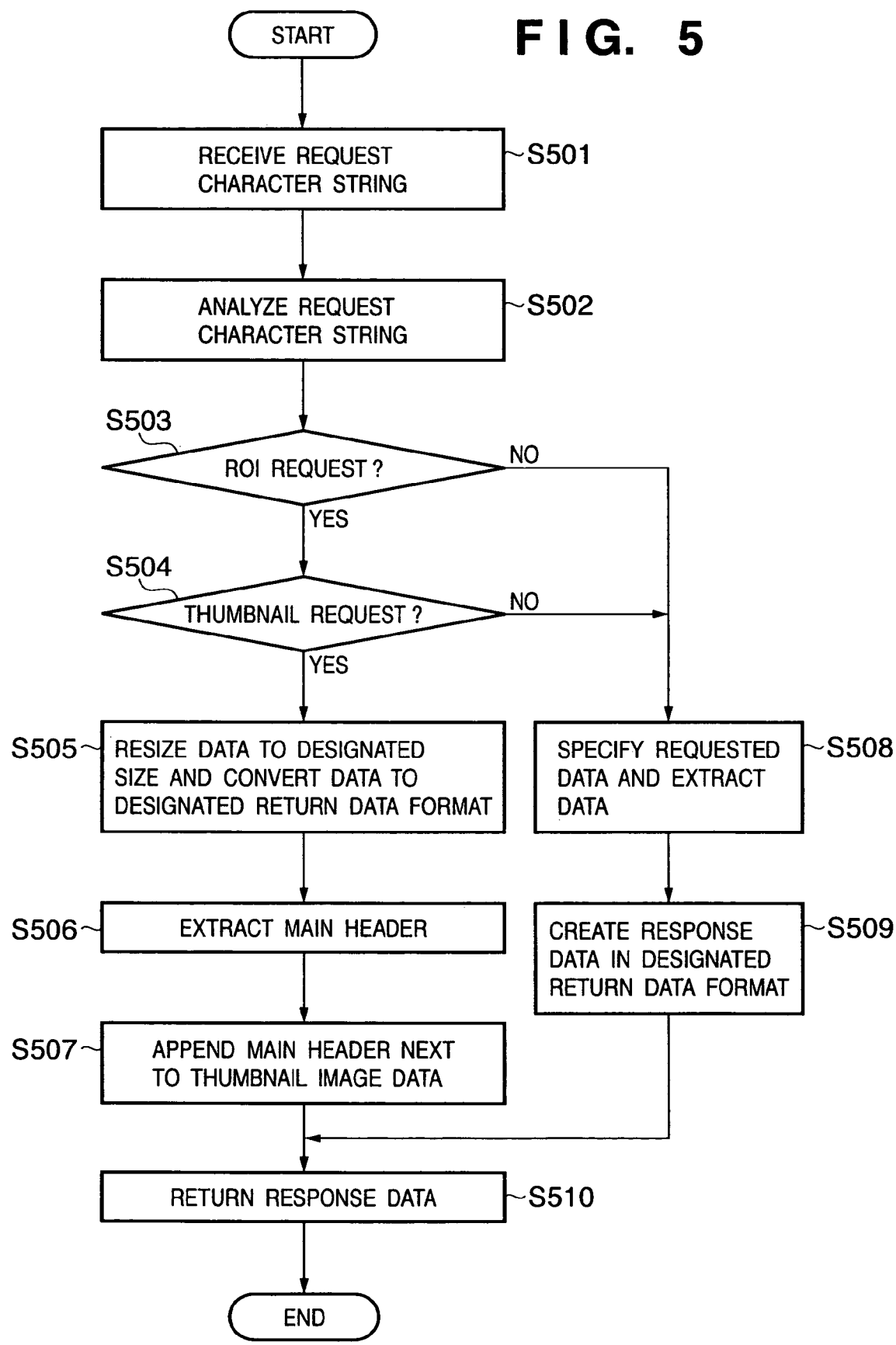
FIG. 5 is a flowchart showing server processing according to the first embodiment.

The operation of the server which transmits/receives the above-described data will be described below with reference to the flowchart in FIG. 5.

In step S501, the server receives a request character string from the client. Assume that the following character string is received as the request character string. http://www.image-.com/JPIP.cgi?target=sample.jp2&roi=ganon-thumbnail&fsiz=320,240&type=image/jpeg In step S502, the server analyzes the request character string received in step S501. In this embodiment, the server is requested to transmit image data in a ROI region named "ganon-thumbnail" of a sample.jp2 image. In addition, according to the analysis, the returned entire image size should be 320×240 [pixel], and returned data should have the JPEG format.

In step S503, it is determined whether the request analyzed in step S502 contains a ROI request. If YES in step S503, the flow advances to step S504. If NO in step S503, the flow advances to step S508. In the above-described request character string, a ROI "ganon-thumbnail" is requested. Hence, the flow advances to step S504.

In step S504, it is determined whether the requested ROI corresponds to a thumbnail image. If YES in step S504, the flow advances to step S505. If NO in step S504, the flow advances to step S508. The server of this embodiment knows in advance that the ROI "ganon-thumbnail" is defined as a thumbnail image. Hence, the flow advances to step S505.

In step S505, the entire image is resized to the designated size obtained by analyzing the request character string in step S502, i.e., the size designated in the fsiz field. In addition, the data is converted into the return data format obtained by analyzing the request character string, i.e., the return data format designated in the type field, thereby creating a thumbnail image.

In this example, fsiz=320,240. Resize is done on the basis of this value. JPEG 2000 image data held in the server have the following sizes.

Resolution level 0 . . . 400×300 [pixel]
Resolution level 1 . . . 800×600 [pixel]
Resolution level 2 . . . 1600×1200 [pixel]

The aspect ratio is 4:3. Since the value fsiz is also 320:240=4:3, resize to the designated size is possible. In this case, the image is converted into a JPEG image having a size of 320 [pixel]×240 [pixel].

If the image aspect ratio designated by the request is different from the aspect ratio of the original JPEG 2000 image, resize is done in accordance with the aspect ratio of the original JPEG 2000 image. The client is notified of it by a JPIP response header (JPIP-fsiz) representing that the returned size is different from the requested size in accordance with the definition of JPIP. For example, when fsiz=320, 320 is requested, and the original size of the JPEG 2000 image is 1600×1200 [pixel], the server returns an image resized to 320×240 [pixel] together with a JPIP response header "JPIP-fsiz:320,240".

The image data can be either first decoded to resolution level 2 and then resized to the desired size or first decoded to resolution level 0 (400×300 [pixel]) closest to the desired size and then resized. The resize method is not the gist of the present invention, and a detailed description thereof will be omitted.

In step S506, the main header 301 is extracted from the requested JPEG 2000 image. In this embodiment, the main header 301 is extracted from JPEG 2000 encoded data of "sample.jp2" designated in the "target" field. In step S507, the main header data of the original JPEG 2000 image data, which is extracted in step S506, is appended next to the thumbnail image data created in step S505. Then, the flow advances to step S510.

On the other hand, if NO in step S503 or S504, the processing advances to step S508. In step S508, the requested data is specified from the analysis result of the request character string in step S502 and extracted from the JPEG 2000 encoded data. In step S509, response data having the designated return data format is created on the basis of the data extracted in step S508, and the flow advances to step S510. Steps S508 and S509 are normal JPIP server processing, which is not the gist of the present invention, and a detailed description thereof will be omitted.

In step S510, the data created in step S507 or S509 is returned as response data, and the server processing is ended.

According to the request of this embodiment, even when the server cannot recognize that "ganon-thumbnail" in the character string is a ROI indicating a thumbnail image followed by the main header of the original JPEG 2000 image, the request is processed as a normal ROI request, and a JPEG image having a size of 320×240 [pixel] and containing no main header is returned. Hence, the client can appropriately display the thumbnail image.

Even when the server cannot process the ROI request itself, a JPIP header "JPIP-roi:no-roi" to notify the client that the ROI cannot be processed and a JPEG image having a size of 320×240 [pixel] based on the request character string except the roi field are returned. Hence, the client can appropriately display the thumbnail image.

Even when the client does not comply with the present invention and cannot recognize that the main header is appended next to the JPEG image data returned from the server, a thumbnail image can be displayed by decoding the transmitted data.

A client complying with the present invention extracts the main header of the original JPEG 2000 encoded data, which is appended next to the JPEG image data returned from the server, and analyzes the main header. With this operation, interactive communication using JPIP can smoothly be started even in, e.g., magnifying the image after thumbnail display.

As described above, according to the server/client system of this embodiment, the client can acquire, by one communication, an image (e.g., a thumbnail image) obtained by processing layered encoded data on the basis of a special command (e.g., a thumbnail acquisition command of the embodiment) and the main header of original JPEG 2000 encoded data. Even when interactive communication using JPIP is to be executed after thumbnail display, the client can know the decoding condition of the JPEG 2000 image to be displayed by analyzing the already received main header and therefore easily request necessary partial data by JPIP communication.

Second Embodiment

The second embodiment of the present invention will be described below. In the above-described first embodiment, since each client can designate the size of a thumbnail image, the server must create a thumbnail image for every request reception. As a characteristic feature of the second embodiment, when it is known in advance that both the server and the client are systems complying with the present invention, the thumbnail image size and return data format are determined in advance.

In the second embodiment, when the name of a ROI is "ganon-thumbnail", data created by appending a main header, which is extracted from original JPEG 2000 encoded data, to a JPEG image having a size of 320×320 [pixel] or less is returned, as in the first embodiment. In this case, the client which requires the thumbnail image issues the following request. http://www.image.com/JPIP.cgi?target=sample.jp2&roi=gan on-thumbnail Server processing is different from that shown in FIG. 5 of the first embodiment in the portion of steps S505 to S507.

Figure 6:
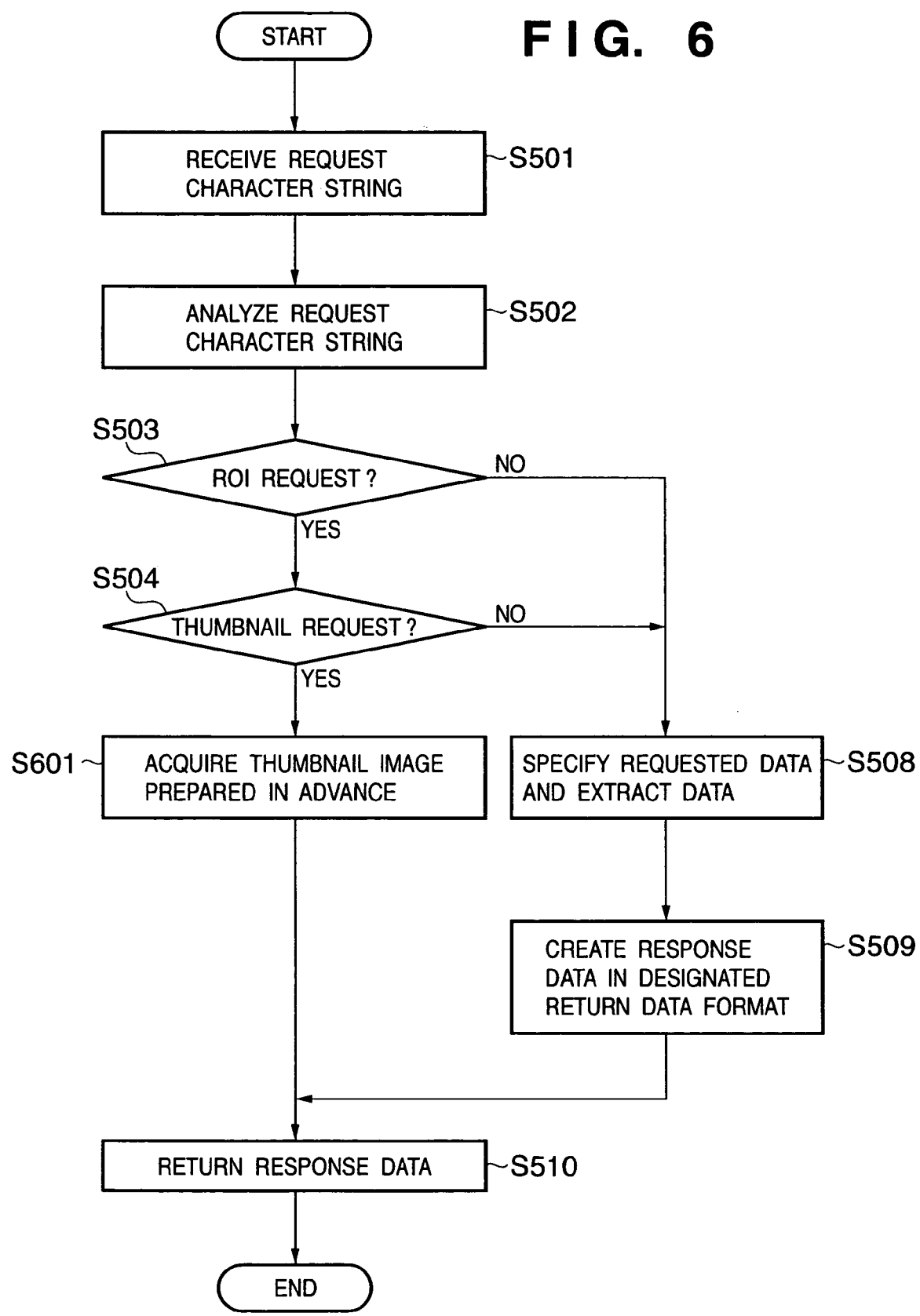
FIG. 6 is a flowchart showing server processing according to the second embodiment.

Server processing according to the second embodiment will be described below with reference to the flowchart in FIG. 6. The same step numbers as in FIG. 5 indicate the same operations in FIG. 6, and a description thereof will be omitted.

In steps S501 to S504, the same operation as in the first embodiment is executed. If it is determined in step S504 that the ROI request is a thumbnail request, the flow advances to step S601.

In step S601, a thumbnail image prepared in advance is acquired. This thumbnail image is data containing thumbnail image data and a main header appended next to the thumbnail image data, which is extracted from original JPEG 2000 encoded data, as described in the first embodiment. This thumbnail image may be stored in the same file or prepared as another file and made to correspond to the original image by a certain mechanism. To make another file correspond to the original image, for example, a file having the same name and a different extension, i.e., "sample.jpg" corresponding to "sample.jp2" may be created. Alternatively, a completely irrelevant file name may be associated with the original JPEG 2000 image data by using a table.

In the example of the second embodiment, after the thumbnail image data corresponding to "sample.jp2" is acquired, the processing advances to step S510. The operations in steps S508, S509, and S510 are the same as in the first embodiment, and a description thereof will be omitted.

If the request of the second embodiment is issued from a client complying with the present invention to a server not complying with the present invention, the server behaves like a general JPIP server. That is, the JPIP server which has received the request without the "fsiz" field returns only the main header data and the header data of the file without returning the image data. The client side can acquire at least the main header data. Hence, the same operation as in a server/client system not complying with the present invention is executed.

As described above, according to the second embodiment, when thumbnail data is prepared on the server side in advance, the processing load on the server can be smaller than in the above-described first embodiment, and the time to prepare the return data can be shortened.

Third Embodiment

The third embodiment of the present invention will be described below.

In the third embodiment, when the ROI name is "ganon-thumbnail", the main header and the data of resolution level 0 are extracted from the original JPEG 2000 encoded data and returned as JPEG 2000 encoded data.

In this case, unlike the above-described first and second embodiments, the main header extracted from the original JPEG 2000 encoded data already exists. For this reason, the main header extracted from the original JPEG 2000 encoded data need not be inserted again after the encoded image data. Hence, the third embodiment is different from the second embodiment in the thumbnail image prepared in step S601 in FIG. 6.

Figure 12:
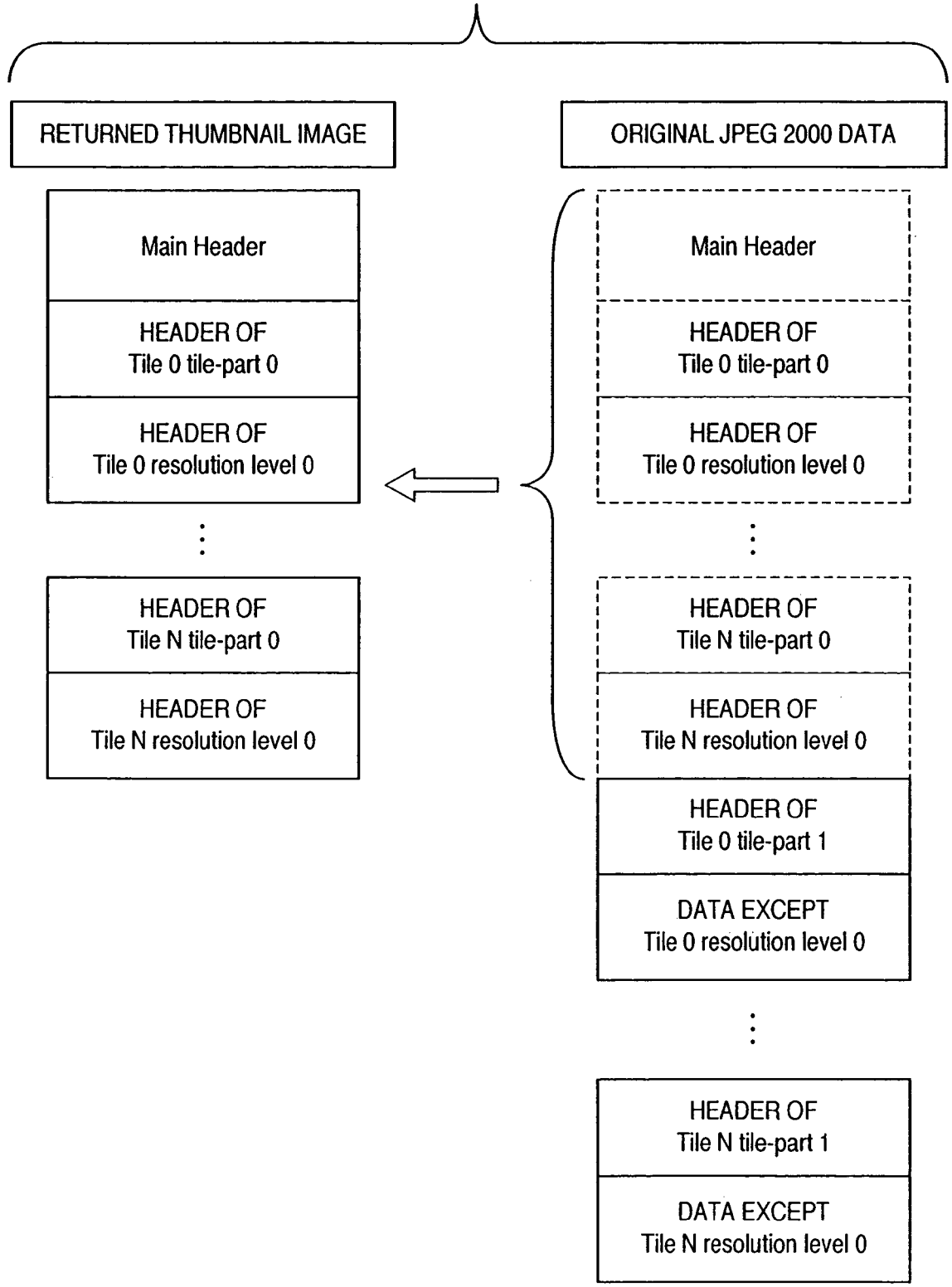
FIG. 12 is a view showing the structures of returned data and server-side JPEG 2000 image data according to the third embodiment.

Thumbnail image data to be returned in the third embodiment is shown on the left side of FIG. 12. Original JPEG 2000 encoded data is shown on the right side of FIG. 12. As shown on the right side of FIG. 12, data corresponding to resolution level 0 in the respective tile, are put together as data with tile-part number 0, and only data of tile-part 0 of the respective tiles are put together at the top of the JPEG 2000 encoded data. With this structure, the thumbnail image can easily be extracted and returned, as shown on the left side of FIG. 12. The encoded data shown on the right side of FIG. 12 can easily be generated by using the progression order RLCP or RPCL with the resolution scalability.

The JPEG 2000 data shown on the left side of FIG. 12 is formed by extracting part of the original JPEG 2000 encoded data shown on the right side of FIG. 12. Hence, when the encoding condition represented by the main header is compared with the subsequent data, some data lack. However, generally, the JPEG 2000 client can decode even encoded data obtained by extracting the top portion of the encoded data.

According to the third embodiment, the image size cannot be changed for each client. In addition, since the thumbnail image to be returned depends on the size of resolution level 0 in encoding, the image cannot uniformly have a predetermined size, either.

However, according to the third embodiment, the server side need not prepare thumbnail data as separate encoded data. In addition, since the top portion of original JPEG 2000 encoded data can be extracted and used as return data, the time to prepare the returned data can be shortened. Furthermore, the main header of the returned JPEG 2000 encoded data is the main header of the original JPEG 2000 encoded data. For this reason, the client can know the encoding condition of the original JPEG 2000 encoded data so that interactive communication after thumbnail acquisition can smoothly be started.

As described above, according to the third embodiment, since data is returned as a JPEG 2000 code stream or converted and returned as the JP2 file format, the client only needs to have one kind of decoder.

Fourth Embodiment

The fourth embodiment of the present invention will be described below.

In the first to third embodiments, a method of acquiring a thumbnail image by one request has been described. When the same method as in the first to third embodiments is applied in acquiring image data whose ROI region becomes so small as to fit in the display screen, the data can be acquired by issuing one request.

In the fourth embodiment, a method will be described, in which a server which holds a plurality of already generated JPEG 2000 files receives a request from a client, analyzes the request, resizes an image containing a ROI region from a designated JPEG 2000 image to an appropriate size, and transmits the image to the client. The client user opens a homepage by using a portable terminal, clicks on link information in which a character string corresponding to an image name to acquire the JPEG 2000 image on that homepage, transmits, to the server, a request of an image which is resized such that the ROI region becomes so small as to fit in the display screen, and acquires and displays the image by using the mechanism of JPIP.

In the fourth embodiment, JPEG 2000 image data held in the server has three resolutions corresponding to the following sizes.

Resolution level 0 . . . 400×300 [pixel]
Resolution level 1 . . . 800×600 [pixel]
Resolution level 2 . . . 1600×1200 [pixel]

Figure 7:
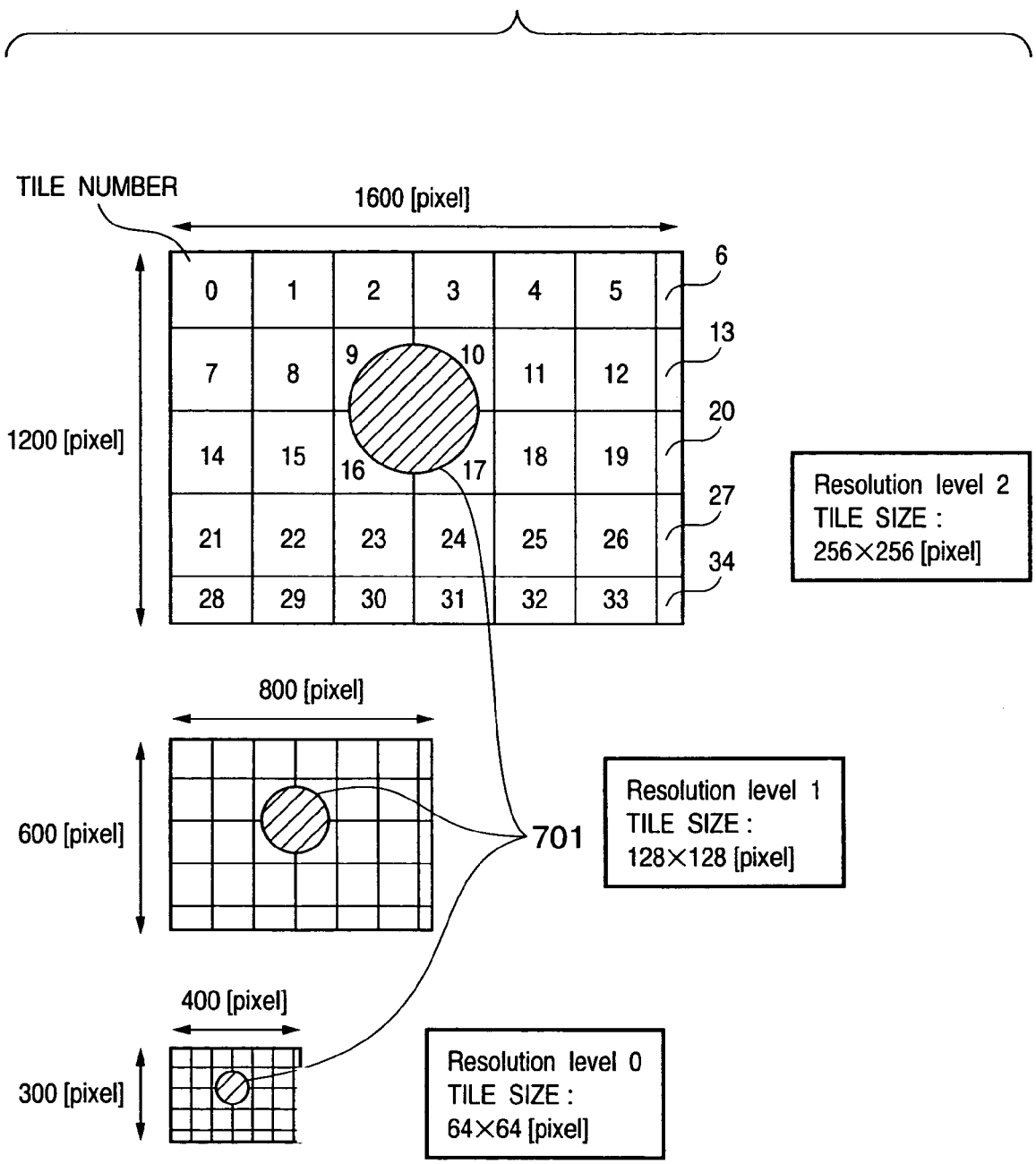
FIG. 7 is a view showing tile segmentation of a JPEG 2000 image on a server side according to the fourth embodiment.

This image data is segmented into tiles of 256×256 [pixel] at resolution level 2. FIG. 7 shows a structure example of image data according to the fourth embodiment. A region 701 indicated by a hatched portion in FIG. 7 is defined as a ROI region. The ROI region 701 may be defined as a ROI in the ROI description box. Alternatively, the encoded data itself may be encoded as a ROI. In this example, the ROI region is a region described as a ROI at the top of the ROI description box.

The client transmits the following command to the server having such image data in accordance with the definition of JPIP to acquire a whole image obtained by resizing the region defined as a ROI in the image to such a size as to fit in the region of 320×240 [pixel]. http://www.image.com/JPIP.cgi?target=sample.jp2&roi=ganon-download&fsiz=320,240&type=image/jpeg This request is interpreted in accordance with definition of JPIP. The client requests image data in a ROI region named "ganon-download" of a "sample.jp2" image. It is instructed that the entire image should have a size of 320×240 [pixel], and the return data format should be JPEG.

Between the server and client complying with the present invention, however, the ROI "ganon-download" is a special command defined as a ROI containing a special meaning. A request containing this ROI request is defined to resize the entire image such as the ROI designated by "ganon-download" becomes so small as to fit in the size designated by "fsiz", convert the data into designated return image data, and return, to the client, data obtained by appending the main header of original JPEG 2000 encoded data next to the return image data.

Figure 8:
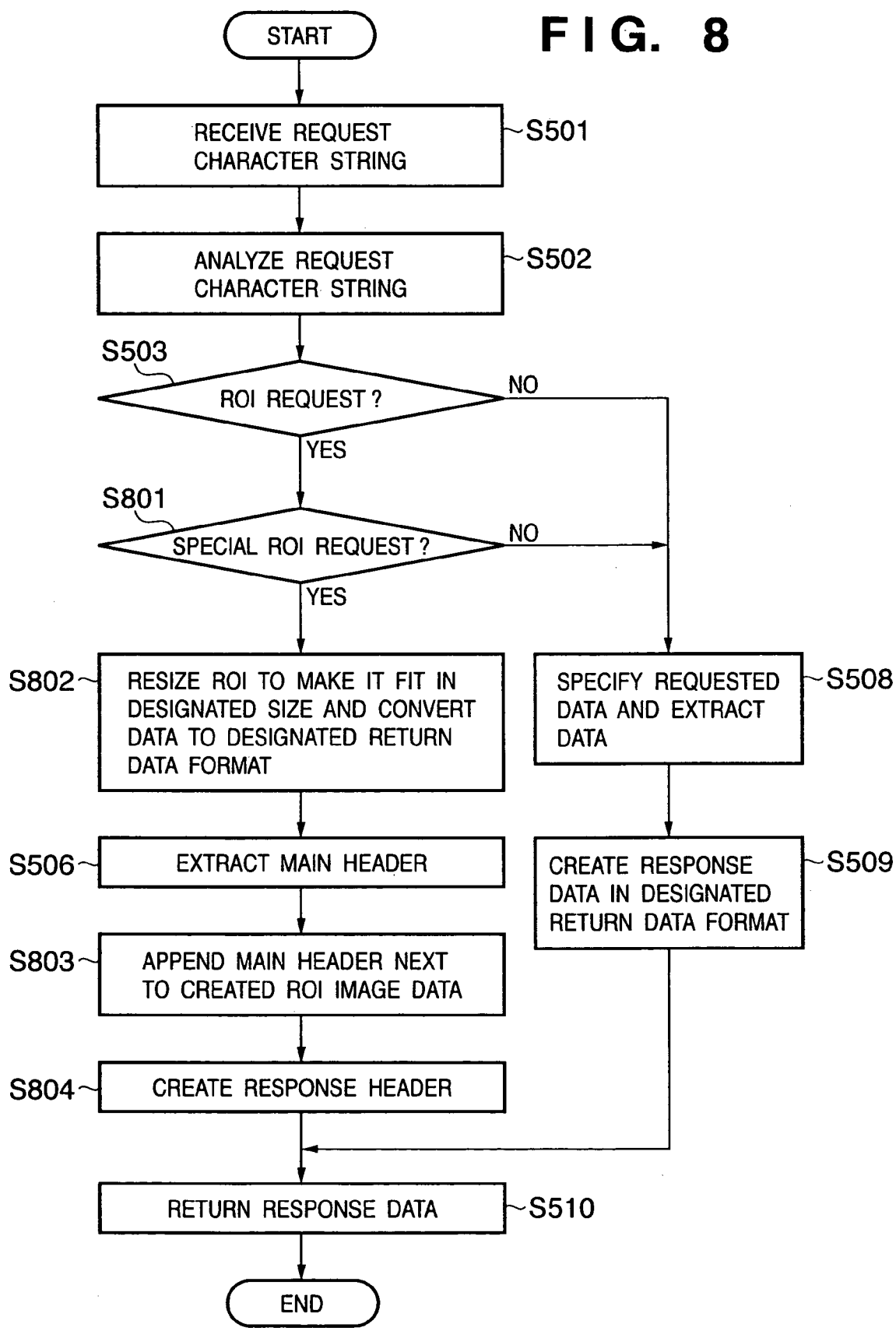
FIG. 8 is a flowchart showing server processing according to the fourth embodiment.

The operation of the server according to the fourth embodiment will be described below with reference to the flowchart in FIG. 8. The same step numbers as in FIG. 5 of the above-described first embodiment indicate the same operations in FIG. 8, and a description thereof will be omitted.

In steps S501 to S503, the same operation as in the first embodiment is executed. In step S801, it is determined whether the ROI request obtained by analysis in step S502 is a special ROI request. If YES in step S801, the flow advances to step S802. If NO in step S801, the flow advances to step S508. In the fourth embodiment, since the request received from the client contains "ganon-download" as a special ROI request, the processing advances to step S802.

In step S802, the entire image is resized such that the requested special ROI becomes so small as to fit in the designated size obtained by analysis in step S502 and converted into the designated return image data format. In the fourth embodiment, fsiz=320,240. Hence, the image is resized such that the ROI region fits in 320×240 [pixel], and converted into the JPEG format. More specifically, the ROI region is the region 701 shown in FIG. 7. Hence, the image is resized such that four tiles (tiles 9, 10, 16, and 17) including the region 701 have a size of 320×240 [pixel]. Hence, the entire image is resized to 750×563 [pixel] such that the four tiles 9, 10, 16, and 17 have a size of 240×240 [pixel], and converted into JPEG.

In step S506, the main header is extracted from the original JPEG 2000 encoded data, as in the first embodiment. In step S803, the main header extracted in step S506 is appended next to the image data created in step S802. In the fourth embodiment, the main header of sample.jp2, which is extracted in step S803, is appended to next to the JPEG image data of 750×563 [pixel] created in step S802.

In step S804, a JPIP response header is created. That is, the width and height of the return image and the position of a region to be specified as a ROI are indicated as a JPIP-roi header. More specifically, since the image created in step S802 and the ROI in it have a positional relationship shown in FIG. 9, the response header is created as follows. JPIP-roi: roi=ganon-download;fsiz=750,563;rsiz=240,240;r off=240, 120

A character string following "roi=" represents the name of the ROI. Two integers following "fsiz=" indicate the width and height of the return image. Two integers following "rsiz=" indicate the size of the ROI region. Two integers following "roff=" indicate the position of the ROI region.

In steps S508, S509, and S510, the same operation as general JPIP is executed, as in the first embodiment, and a description thereof will be omitted.

As described above, according to the request of the fourth embodiment, even when the server cannot recognize that "ganon-download" is a ROI indicating a special ROI region return format, the request can be processed as a normal ROI request. For example, when "ganon-download" is recognized as a region indicated by 701 in FIG. 7, a ROI region represented by "ganon-download" is extracted from the entire image having a size within 320×240 [pixel] and returned. That is, a JPEG image containing only a ROI region without the main header is returned.

Even when the server cannot process the ROI request itself or cannot specify the ROI with the name "ganon-download", a JPIP header "JPIP-roi:no-roi" to notify the client that the ROI cannot be-processed and a JPEG image entirely resized to 320×240 [pixel] based on the request character string except the roi field are returned. Hence, the client can appropriately display the desired image.

If a plurality of ROIs are present, a region including the plurality of ROIs may be defined as a region corresponding to "ganon-download".

Even when the client does not comply with the present invention and cannot recognize that the main header is appended next to the JPEG image data returned from the server, an image can be displayed by decoding the transmitted data. In addition, the client can determines the location of the ROI region in the return image data on the basis of the description in the JPIP response header.

A client complying with the present invention extracts the main header of the original JPEG 2000 encoded data, which is appended next to the JPEG image data returned from the server, and analyzes the main header. With this operation, interactive communication using JPIP can smoothly be started even in, e.g., magnifying the image after display of the received JPEG data.

As described above, according to the server/client system of the fourth embodiment, the client can acquire, by one communication, image data which can be displayed in an appropriate ROI size, and simultaneously, the main header of original JPEG 2000 encoded data. Even when interactive communication using JPIP is to be executed after image display, the client can know the decoding condition of the JPEG 2000 image to be displayed by analyzing the already received main header and therefore request necessary partial data by JPIP communication.

Even in the fourth embodiment, it is effective to determine the size of a ROI in advance between the server and the client and create image data corresponding to "roi=ganon-download" on the server side in advance, as in the second embodiment. In this case, the system cannot cope with clients with different screen sizes. However, since return data need not be created by re-encoding, the response speed of the server can be expected to increase.

It is also effective to cause the server to determine the size of a ROI for each image, determine a resolution level R corresponding to "roi=ganon-download" in advance on the server side, extract data up to the resolution level R as tile-parts, and arrange them at the top of the original JPEG 2000 encoded data, as in the above-described third embodiment. That is, as image data corresponding to "roi=ganon-download", data up to the tile-part of resolution level R are extracted from the top of the original JPEG 2000 encoded data and returned to the client as return data. In this case, the image size depends on the size of each resolution level in encoding. Hence, images cannot uniformly have a predetermined size. However, since the server side need not prepare ROI data as separate encoded data, the storage capacity of the server can be reduced. In addition, the time to prepare the return data can be shortened.

Fifth Embodiment

The fifth embodiment of the present invention will be described below.

In the above-described fourth embodiment, the data of an entire image whose ROI region has such a size as to fit in the display screen is acquired by issuing a request once. Only data in a ROI region can be acquired by using the same method.

In the fifth embodiment, when the name of a ROI is "ganon-download", a corresponding ROI region is extracted. Data obtained by appending a main header, which is extracted from original JPEG 2000 encoded data, to a JPEG image having a size of 320×320 [pixel] or less is returned, as in the above-described embodiments. In this case, the client which requires the ROI image issues the following request. http://www.image.com/JPIP.cgi?target=sample.jp2&roi=ganon-download&rsiz=320,240&type=image/jpeg In the request, the "rsiz" field designates the size of a region to be extracted from the entire image. Generally in JPIP, the size of the entire image is designated by the "fsiz" field. On the basis of the size, the size of the rectangular region to be extracted can be designated by the "rsiz" field, and the upper left corner of the region to be extracted can be designated by the "roff" field.

Figure 10:
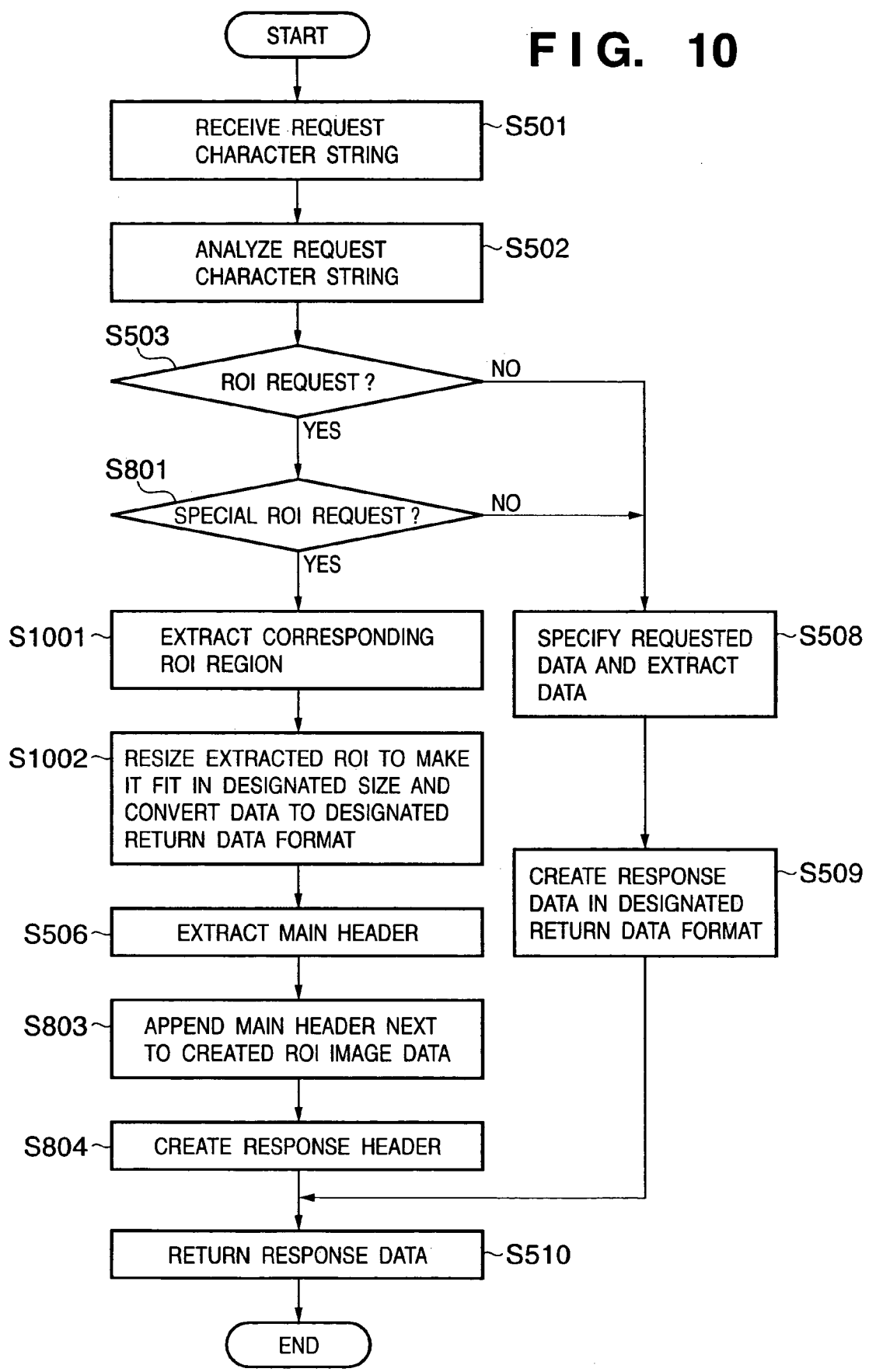
FIG. 10 is a flowchart showing server processing according to the fifth embodiment.

The operation of the server according to the fifth embodiment will be described below with reference to the flowchart in FIG. 10. The same step numbers as in FIG. 8 of the above-described fourth embodiment indicate the same operations in FIG. 10, and a description thereof will be omitted.

In steps S501 to S503 and S801, the same operation as in the fourth embodiment is executed. In step S1001, a region corresponding to the special ROI is extracted from image data. The special ROI region is a region 701 shown in FIG. 7, as in the fourth embodiment. That is, four tiles (tiles 9, 10, 16, and 17) including the region 701 are extracted.

In step S1002, the ROI region extracted in step S1001 is resized to the designated size obtained by analysis in step S502 and converted into the designated return image data format. In the fifth embodiment, rsiz=320,240. Hence, the extracted region 701 including the tiles 9, 10, 16, and 17 is changed to such a size so as to fit in 320×240 [pixel] and converted into the JPEG format. More specifically, the region including the four tiles 9, 10, 16, and 17 is converted into a JPEG image having a size of 320×240 [pixel].

In steps S803, S804, S508, S509, and S510, the same operation as general JPIP is executed, as in the fourth embodiment, and a description thereof will be omitted.

Figure 9:
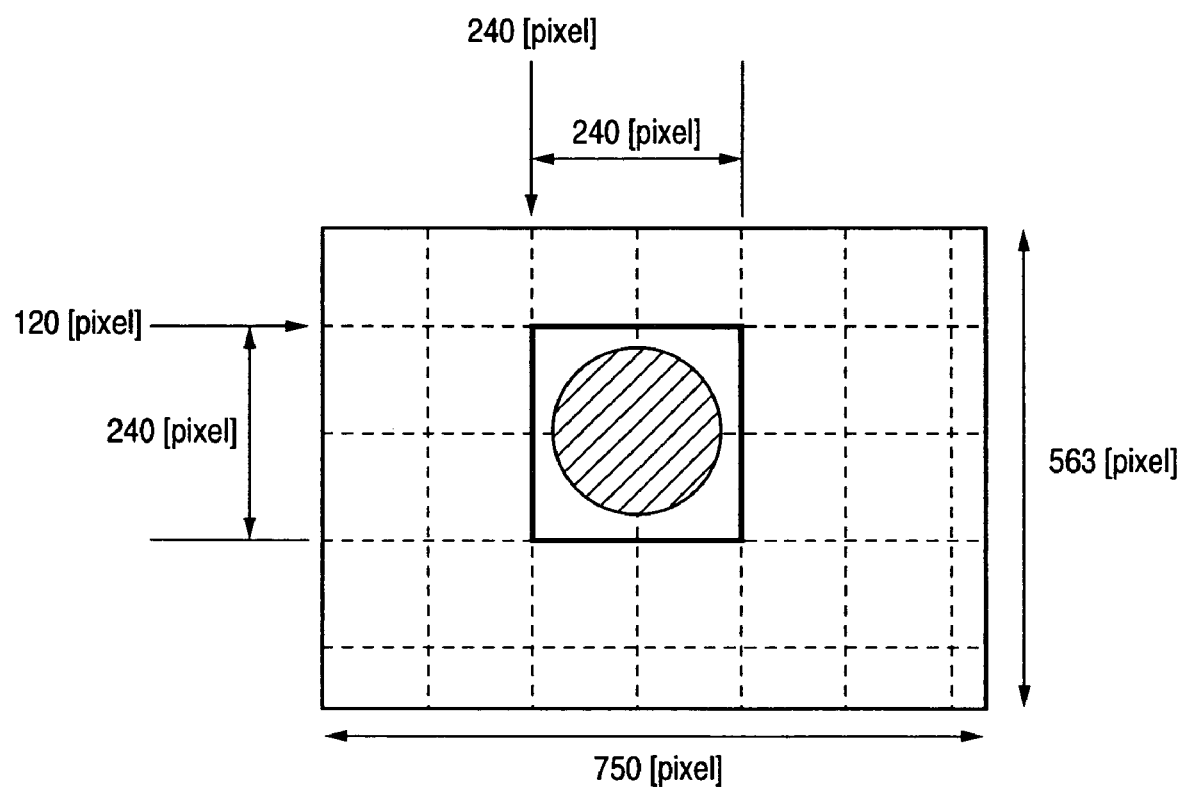
FIG. 9 is a view showing the positional relationship between returned image data and a ROI region according to the fourth embodiment.

Even in the fifth embodiment, since the image created in step S1002 and the ROI in it have a positional relationship shown in FIG. 9, the following response header is created, as in the fourth embodiment. JPIP-roi:roi=ganon-download; fsiz=750,563;rsiz=240,240;r off=240,120

As described above, according to the request of the fifth embodiment, even when the server cannot recognize that "ganon-download" is a ROI indicating a special ROI region return format, the request can be processed as a normal ROI request. In this case, no "fsiz" field is described in the request. For this reason, the JPIP server which has received the request returns only the main header data and the header data of the file without returning the image data. The client side can acquire at least the main header data. Hence, the same operation as in a server/client system not complying with the present invention is executed.

Even when the server cannot process the ROI request itself or cannot specify the ROI with the name "ganon-download", data created by the request character string except the roi field is returned. Hence, only the main header data and the header data of the file are returned together with a JPIP header "JPIP-roi:no-roi" to notify the client that the ROI cannot be processed.

If a plurality of ROIs are present, a region including the plurality of ROIs may be defined as a region corresponding to "ganon-download".

Even when the client does not comply with the present invention and cannot recognize that the main header is appended next to the JPEG image data returned from the server, an image can be displayed by decoding the transmitted data.

A client complying with the present invention extracts the main header of the original JPEG 2000 encoded data, which is appended next to the JPEG image data returned from the server, and analyzes the main header. With this operation, interactive communication using JPIP can smoothly be started even in, e.g., magnifying the image after display of the received JPEG data.

As described above, according to the server/client system of the fifth embodiment, the client can acquire, by one communication, ROI image data which can be displayed in an appropriate size, and simultaneously, the main header of original JPEG 2000 encoded data. Even when interactive communication using JPIP is to be executed after image display, the client can know the decoding condition of the JPEG 2000 image to be displayed by analyzing the already received main header and therefore request necessary partial data by JPIP communication.

Even in the fifth embodiment, it is effective to determine the size of a ROI in advance between the server and the client and prepare image data corresponding to "roi=ganon-download" on the server side in advance, as in the second embodiment. In this case, the system cannot cope with clients with different screen sizes. However, since return data need not be created by re-encoding, the response speed of the server can be expected to increase.

It is also effective to combine the fifth embodiment with the fourth embodiment. That is, when "roi=ganon-download" and "fsiz" are designated, an entire image is returned. When "roi=ganon-download" and "rsiz" are designated, a partial region of an image is returned.

In both the fourth and fifth embodiments, the ROI region is extracted along the tile boundary of a JPEG 2000 image. Instead, the region may be extracted regardless of the tile boundary.

In the above-described embodiments, return data has the JPEG image data format easily to decode. However, any other format such as a PNG format capable of lossless compression may be used.

A system that combines the first and fourth embodiments or the second and fourth embodiments, or a system that combines the first and fifth embodiments or the second and fifth embodiments can also be implemented.

Sixth Embodiment

In the first to fifth embodiments, the operation on the server side has been described. In the sixth embodiment, the operation of a client after it receives JPEG image data and the JPEG 2000 main header, which are acquired from the server of the first embodiment by using a special command, will be described.

As in the first embodiment, the client of this embodiment transmits, to the server, a request character string http://www.image.com/JPIP.cgi?target=sample.jp2&roi=ganon-thumbnail&fsiz=320,240&type=image/jpeg and receives a JPEG image having a size of 320×240 [pixel] and the main header data of original JPEG 2000 image data, which is appended next to the JPEG image. The operation of the client at this time will be described with reference to the flowchart in FIG. 13.

In step S1301, response data from the server is received. In step S1302, of the response data from the server, the JPIP header portion is analyzed. In this embodiment, the server side analyzes the request from the client, which contains the special command "roi=ganon-thumbnail", and returns a thumbnail image of 320×240 [pixel]. For this reason, no JPIP header needs to be transmitted. Hence, in step S1302, it is analyzed that the return data contains no JPIP header. In step S1303, it is determined on the basis of the analysis result in step S1302 whether the server could process the special command. If YES in step S1303, the flow advances to step S1304. If NO in step S1303, the flow advances to step S1306.

In this embodiment, the JPIP header "JPIP-roi:no-roi" to notify the client that the ROI could not be processed is absent in the return data. Hence, it is determined that the server could understand and process the special command "roi=ganon-thumbnail", and the flow advances to step S1304. In step S1304, the main header of the original JPEG 2000 image data is separated from the received image data. In this embodiment, main header data next to the JPEG image data is separated. More specifically, the received binary data is scanned from the final byte toward the top of the data to search for a SOC marker (0xFF4F) which indicates the start of the JPEG 2000 main header. A portion after the SOC marker is separated as the main header, and data ahead of the SOC marker by one is separated as JPEG image data. The JPEG 2000 main header can be separated by various methods except those described above. However, it is not the gist of the present invention, and a detailed description thereof will be omitted.

In step S1305, the JPEG 2000 main header separated in step S1304 is cached. Various cache methods are available, though it is not the gist of the present invention, and a detailed description thereof will be omitted.

In step S1306, the received JPEG image is decoded and displayed, and the flow is ended.

Figure 13:
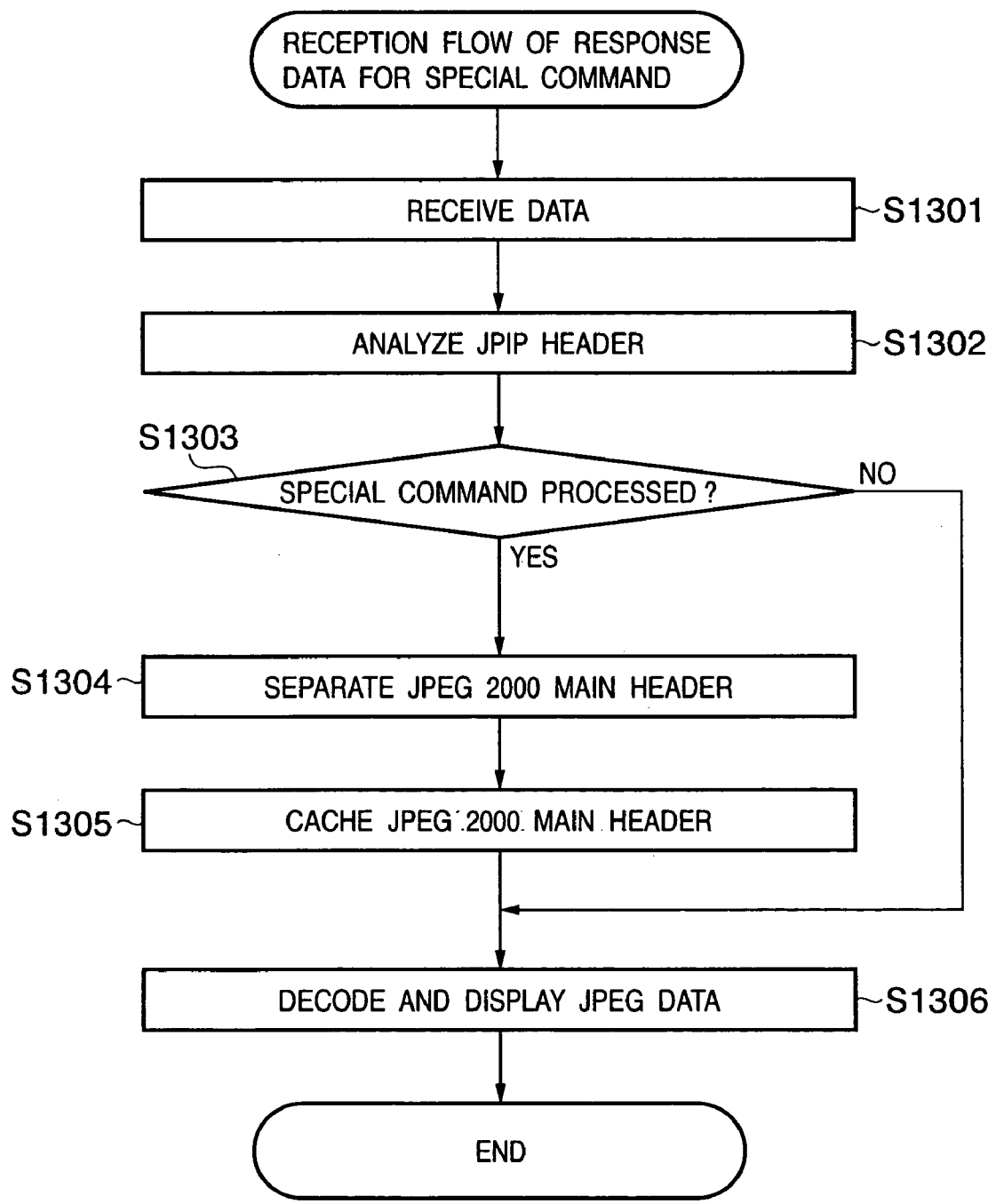
FIG. 13 is a flowchart showing received data processing of a client according to the sixth embodiment.

With the operation shown in FIG. 13, the client terminal can display a thumbnail list (overview) of images on a homepage which provides an album service.

Figure 14:
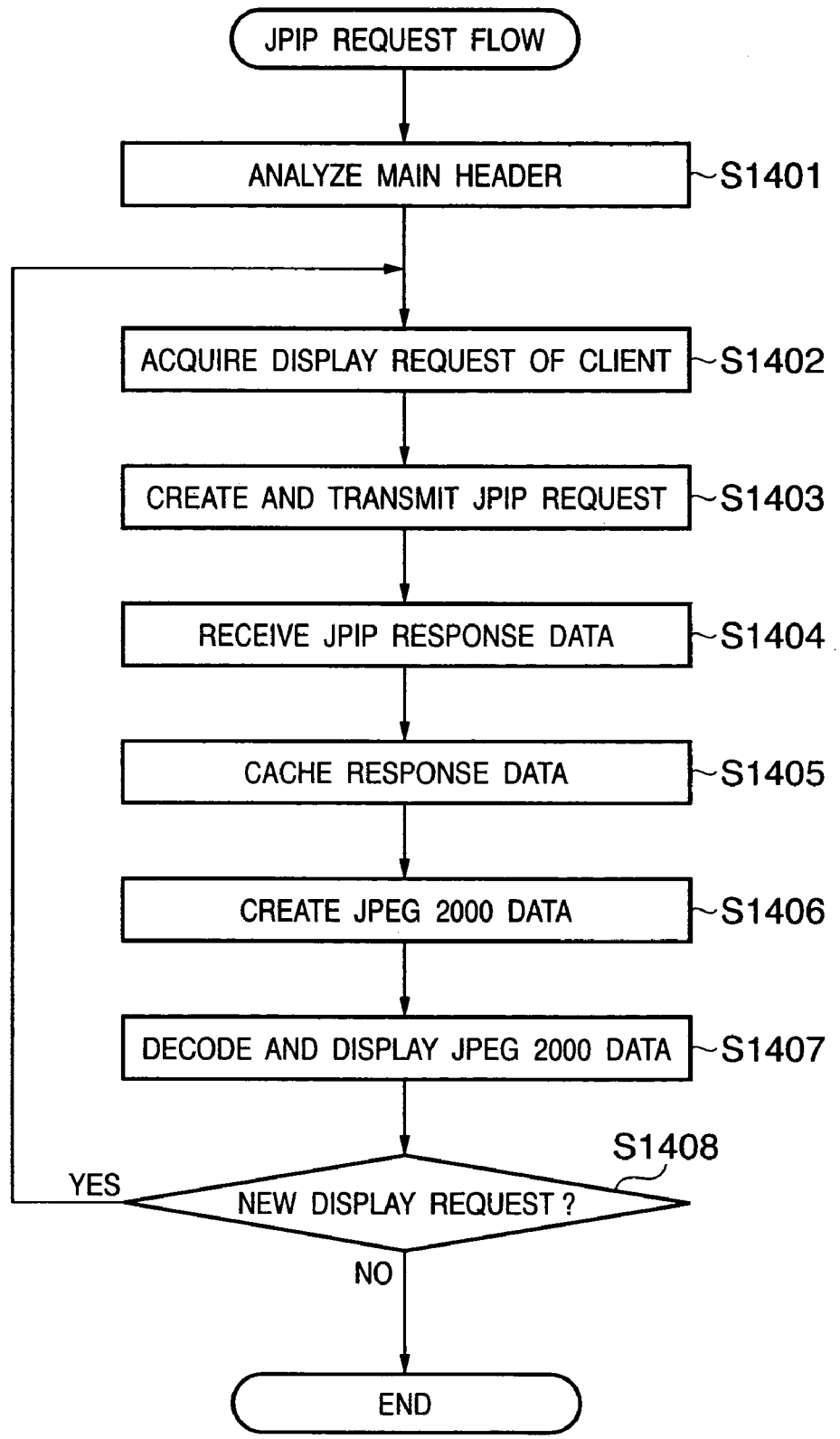
FIG. 14 is a flowchart showing the JPIP request flow of a client according to the sixth embodiment.

The operation of the client which selects an image from the thumbnail list and acquires JPEG 2000 image data by using JPIP will be described next with reference to the flowchart in FIG. 14.

In step S1401, the cached JPEG 2000 main header corresponding to the image selected by the client is analyzed to extract the JPEG 2000 image encoding condition. With this analysis, the client can know the basic information of the image, including the maximum image size, the number of resolutions (the number of resolution levels), the number of layers (the number of image qualities), the number of bits per component, the number of components, and the number of segmented tiles. In this embodiment, the image selected by the client has one layer and three resolutions corresponding to the following image sizes:

Resolution level 0 . . . 400×300 [pixel]
Resolution level 1 . . . 800×600 [pixel]
Resolution level 2 . . . 1600×1200 [pixel]

In step S1402, the display request of the client is acquired. In this embodiment, when an image is selected from thumbnail images, data corresponding to an image fit in a region of 1024×768 [pixel] is requested at the highest image quality. In step S1403, a JPIP request is created on the basis of the analysis result in step S1401 and the display request of the client, which is acquired in step S1402, and transmitted to the server. The JPIP request creation method is an operation executed by a general JPIP client, and a detailed description thereof will be omitted. In this embodiment, a JPIP request http://www.image.com/JPIP.cgi?target=sample.jp2&fsiz=80 0,600&type=image/jpp-stream&need——=r0,r1 is issued to the server.

In step S1404, JPIP response data is received from the server. In step S1405, the response data received in step S1404 is analyzed and written in the cache. The JPIP response data analyzing method is an operation executed by a general JPIP client, and a detailed description thereof will be omitted. In addition, various cache write methods are available, though it is not the gist of the present invention, and a detailed description thereof will be omitted.

In step S1406, necessary JPEG 2000 image data is created from the cache data. In this embodiment, necessary JPEG 2000 image data can be created by extracting, from the cache, the main header data and the resolution level 0 and resolution level 1 data. In step S1407, the JPEG 2000 data created in step S1406 is decoded and displayed. In step S1408, it is determined whether a new display request is issued from the client. If YES in step S1408, the processing returns to step S1402. If NO in step S1408, the flow is ended.

When the original JPEG 2000 main header is cached and used in image request by using JPIP on the client side, the partial JPEG 2000 data transfer can smoothly be started. Hence, the transfer time and response time can be shortened.

In this embodiment, the behavior of the client for server response in the first embodiment has been described. The same processing can be executed on the client side for server return data in the second, fourth, and fifth embodiments.

When the client processes the response data returned by the server according to the third embodiment, the processing of extracting JPEG 2000 main header data from the binary data received from the server in step S1304 of FIG. 13 can be omitted. In the third embodiment, the response data is obtained by extracting resolution level 0 of the original JPEG 2000 data. Hence, when all received data are cached, the subsequent JPIP request can smoothly be started.

The client only needs to request data except the main header and image data at resolution level 0 in the second and subsequent requests.

In the above-described embodiments, placing a focus on the fact that known JPEG 2000 encoded data is hierarchically encoded to express a plurality of resolutions, the "thumbnail (low-resolution image)" and "JPEG 2000 main header" are contained in one return data from the server to the client. However, the present invention is not limited to this. For example, JPEG 2000 data is hierarchically encoded not only in the resolution level but also in the layer level. The concept of resolution is replaced with the layer. For example, even when the "image data formed by a lower layer (image data with a poor S/N ratio)" and "JPEG 2000 main header" are contained in one return data from the server to the client, subsequent interactive communication can efficiently be done, as in the above embodiments. Hence, this modification is also incorporated in the present invention.

Other Embodiments

The present invention can be applied to a system comprising a plurality of devices (e.g., host computer, interface, reader, printer) or to an apparatus comprising a single device (e.g., multi-function peripheral).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

If the present invention is realized as a storage medium, program codes corresponding to the above mentioned flowcharts are to be stored in the storage medium.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-257420 filed on Sep. 3, 2004 and 2005-213373 filed on Jul. 22, 2005, which are hereby incorporated by reference herein.

What is claimed is:

1. An image communication system comprising a server that stores hierarchically encoded JPEG 2000 image data in a storage unit, and a client configured to download image data from the server and to display an image based on downloaded image data, wherein the server:
receives a thumbnail request or a Region Of Interest (ROI) acquisition request from the client that has no knowledge about an encoding condition of target JPEG2000 image data;
determines based on the received request whether a specific command, which designates the target JPEG 2000 image data, a size of reduced image data to be returned, and an encoding format of the reduced image data, is requested;
when the specific command is requested, generates new image data by decoding the designated JPEG 2000 image data stored in the storage unit, resizing the decoded image data to the designated size, and converting the resized decoded image data into the designated encoding format;
extracts a JPEG 2000 main header, which includes the encoding condition of the designated JPEG 2000 image data, from the designated JPEG 2000 image data;
generates return data including the new image data and the JPEG 2000 main header, wherein the return data excludes encoded data in the designated JPEG 2000 image data; and
transmits the return data to the client.

2. The system according to claim 1, wherein the specific command designates a region of the image data.

3. The system according to claim 1, wherein the specific command designates an image size of the image data.

4. The system according to claim 1, wherein the specific command designates a compression format of the image data for transmission.

5. The system according to claim 1, wherein when the specific command is not requested, the return data is generated by converting the image data designated by the request into a format designated by the request.

6. The system according to claim 1, wherein the return data is generated every time the request is received.

7. The system according to claim 1, wherein the return data is prepared in the server in advance.

8. The system according to claim 1, wherein the specific command is a command to request a thumbnail of the image data.

9. The system according to claim 1, wherein the specific command is a command to request a specific region of the image data.

10. The system according to claim 9, wherein the return data is generated by extracting the specific region from the image data.

11. The system according to claim 1, wherein the image data is encoded in accordance with a JPEG 2000 method.

12. The system according to claim 11, wherein the additional data is a main header portion in the data encoded in accordance with the JPEG 2000 method.

13. The system according to claim 1, wherein communication between the server and the client is in conformity to a JPIP protocol.

14. The system according to claim 13, wherein the client executes interactive communication with the server on the basis of the additional data for the image data in the return data received from the server.

15. A server apparatus that stores hierarchically encoded JPEG 2000 image data in a storage unit, and transmits an image based on downloaded image data to a client, the server apparatus comprising:
reception means for receiving a thumbnail request or a Region Of Interest (ROI) acquisition request from the client that has no knowledge about an encoding condition of target JPEG2000 image data;
command determination means for determining based on the received request whether a specific command, which designates the target JPEG 2000 image data, a size of reduced image data to be returned, and an encoding format of the reduced image data, is requested;
return data generation means for, when the specific command is requested, generating a new image data by decoding the designated JPEG 2000 image data stored in the storage unit, resizing the decoded image data to the designated size, and converting the resized decoded image data into the designated encoding format;
extraction means for extracting a JPEG 2000 main header, which includes the encoding condition of the designated JPEG 2000 image data, from the designated JPEG 2000 image data;
generating means for generating return data including the new image data and the JPEG 2000 main header, wherein the return data excludes encoded data in the designated JPEG 2000 image data; and
transmission means for transmitting the return data to the client.

16. An image communication method performed by a server apparatus that stores hierarchically encoded JPEG 2000 image data in a storage unit, and transmits an image based on downloaded image data to a client, the method comprising:
a reception step of receiving a thumbnail request or a Region Of Interest (ROI) acquisition request from the client that has no knowledge about an encoding condition of target JPEG2000 image data;
a command determination step of determining based on the received request whether a specific command, which designates the target JPEG 2000 image data, a size of reduced image data to be returned, and an encoding format of the reduced image data, is requested;
a new image data generation step of, when the specific command is requested, generating new image data by decoding the designated JPEG 2000 image data stored in the storage unit, resizing the decoded image data to the designated size, and converting the resized decoded image data into the designated encoding format;
an extraction step of extracting a JPEG 2000 main header, which includes the encoding condition of the designated JPEG 2000 image data, from the designated JPEG 2000 image data;
a return data generation step of generating return data including the new image data and the JPEG 2000 main header, wherein the return data excludes encoded data in the designated JPEG 2000 image data; and a transmission step of transmitting the return data to the client.

17. A computer-readable storage medium that stores a computer-executable program to control an information processing apparatus and cause the apparatus to operate as a server apparatus that stores hierarchically encoded JPEG 2000 image data in a storage unit, and transmits an image based on downloaded image data to a client, the program comprising program code corresponding to:

a reception step of receiving a thumbnail request or a Region Of Interest (ROI) acquisition request from the client who has no knowledge about an encoding condition of target JPEG2000 image data;

a command determination step of determining on the basis of the received request whether a specific command, which designates the target JPEG 2000 image data, a size of reduced image data to be returned, and an encoding format of the reduced image data, is requested;

a new image data generation step of, when the specific command is requested, generating new image data by decoding the designated JPEG 2000 image data stored in the storage unit, resizing the decoded image data to the designated size, and converting the resized decoded image data into the designated encoding format;

an extraction step of extracting a JPEG 2000 main header, which includes the encoding condition of the designated JPEG 2000 image data, from the designated JPEG 2000 image data;

a return data generation step of generating return data including the new image data and the JPEG 2000 main header, wherein the return data excludes encoded data in the designated JPEG 2000 image data; and a transmission step of transmitting the return data to the client.

* * * * *